US012018602B2

(12) United States Patent
Jochman

(10) Patent No.: US 12,018,602 B2
(45) Date of Patent: Jun. 25, 2024

(54) POWER SYSTEMS WITH A REAR SURFACE EXHAUST

(71) Applicant: Illinois Tool Works Inc., Glenview, IL (US)

(72) Inventor: Nathan Joe Jochman, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/854,916

(22) Filed: Jun. 30, 2022

(65) Prior Publication Data

US 2024/0003286 A1 Jan. 4, 2024

(51) Int. Cl.
*F01N 13/08* (2010.01)
*F02B 63/04* (2006.01)

(52) U.S. Cl.
CPC .......... *F01N 13/082* (2013.01); *F02B 63/044* (2013.01); *F01N 2340/00* (2013.01); *F01N 2590/10* (2013.01); *F02B 2063/045* (2013.01)

(58) Field of Classification Search
CPC ............... F01N 13/082; F01N 2340/00; F01N 2590/10; F02B 63/044; F02B 2063/045
See application file for complete search history.

(56) References Cited

U.S. PATENT DOCUMENTS 5,624,589 A * 4/1997 Latvis ...................... B23K 9/32 219/133
5,977,667 A * 11/1999 Hirose .................... F02B 63/04 310/63
6,979,912 B2 * 12/2005 Mazuka .................. F02B 63/04 290/1 A
2007/0137591 A1 * 6/2007 Sugimoto .............. F02M 21/06 123/527
2015/0101320 A1 * 4/2015 Sugano ................. F01N 13/082 60/317
2017/0334012 A1 * 11/2017 Baus ...................... B23K 9/095
2019/0284984 A1 * 9/2019 Takada ................ F01N 13/1844
2020/0212764 A1 * 7/2020 Matsushita ............ H02K 11/33
2021/0017902 A1 * 1/2021 Enyedy ................... F02B 63/04
2022/0299001 A1 * 9/2022 Ito ......................... F02N 15/027
2022/0371716 A1 * 11/2022 Sharp ......................... B63J 3/04

FOREIGN PATENT DOCUMENTS

JP H0533641 A * 2/1993 ............. F02B 63/04
JP 11036882 A * 2/1999 ............. F02B 63/04

* cited by examiner

*Primary Examiner* — Audrey B. Walter

(74) *Attorney, Agent, or Firm* — McAndrews, Held & Malloy, Ltd.

(57) ABSTRACT

Disclosed power systems include an enclosure, an engine within the enclosure, a generator within the enclosure and configured to convert mechanical power from the engine to electrical power, an exhaust system, and one or more of, within the enclosure, welding-type conversion circuitry, an air compressor, a hydraulic pump, or auxiliary power conversion circuitry configured to convert the electrical power from the generator to at least one of AC output power or DC output power. The enclosure defines a rear surface when installed in a predetermined orientation. The exhaust system includes a muffler and a tail pipe, where an exhaust end of the tail pipe is at or near the rear surface of the enclosure.

14 Claims, 4 Drawing Sheets

POWER SYSTEMS WITH A REAR SURFACE EXHAUST

FIELD OF THE DISCLOSURE

This disclosure is directed generally to power systems and, more particularly, to power systems with a rear surface exhaust.

BACKGROUND

Conventionally, engine-driven power systems (e.g., generators/air compressors/welders) are contained within a metal enclosure that provides environmental protection for the equipment and provides a safety, sound, and aesthetic barrier for the operators. Many different types of enclosures have been used for conventional power systems. Conventional enclosures are configured with components in such a way as to house the engine and/or generator components based on their relative locations. Moreover, power systems that include an engine typically include an exhaust system configured to release exhaust from the engine external to the enclosure and reduce noise generated by the engine.

SUMMARY

Power systems with a rear surface exhaust, substantially as illustrated by and described in connection with at least one of the figures.

BRIEF DESCRIPTION OF THE DRAWINGS

The features of the present disclosure will best be understood from a detailed description of the invention and a preferred embodiment thereof selected for the purposes of illustration and shown in the accompanying drawings.

The figures are not necessarily to scale. Where appropriate, similar or identical reference numbers are used to refer to similar or identical components.

DETAILED DESCRIPTION

Engine-driven power systems, which generate and output one or more types of mechanical, electrical, pneumatic, hydraulic, and/or other types of power, rely on an exhaust system to expel exhaust from an engine external to an enclosure of the power system. A muffler of the exhaust system may also help reduce noise associated with operating the engine. In conventional power systems, a tail pipe of the exhaust system extends through a top surface of the enclosure. In such systems, the tail pipe is exposed to the user, presenting a safety risk during operation (e.g., due to increased temperatures of the tail pipe during operation of the power system). Moreover, the power system may be shipped without the tail pipe installed to comply with packaging constraints and to avoid damage during shipping. In this way, a user may have to install the tail pipe (or a portion thereof) themselves upon receiving the power system.

The power system disclosed herein include an exhaust system with a tail pipe that terminates at or near a rear surface of the enclosure. In some examples, the tail pipe may not extend outside of the enclosure at all. Therefore, in power systems with a tail pipe that terminates at or near a rear surface of the enclosure, the tail pipe is not exposed to the user or is minimally exposed to contact with the user (e.g., less exposed than in conventional power systems). In addition, the power system can be shipped fully assembled. In other words, the tail pipe may be preinstalled in the power system prior to shipping such that the user does not have to install the tail pipe (or a portion thereof) themselves. In turn, the disclosed power systems may require less packaging materials and/or have a reduced package size during shipping. Moreover, the disclosed power systems may have fewer parts than conventional power systems.

As used herein, welding-type power refers to power suitable for welding, cladding, plasma cutting, induction heating, laser (including laser welding and laser cladding), carbon arc cutting or gouging and/or resistive preheating. As used herein, welding-type conversion circuitry refers to circuitry which, upon application of input power, converting the input power to welding-type power and outputting the welding-type power, including but not limited to transformer-rectifiers, inverters, converters, resonant power supplies, quasi-resonant power supplies, switch-mode power supplies, etc., as well as control circuitry and other ancillary circuitry associated therewith.

Figure 1:
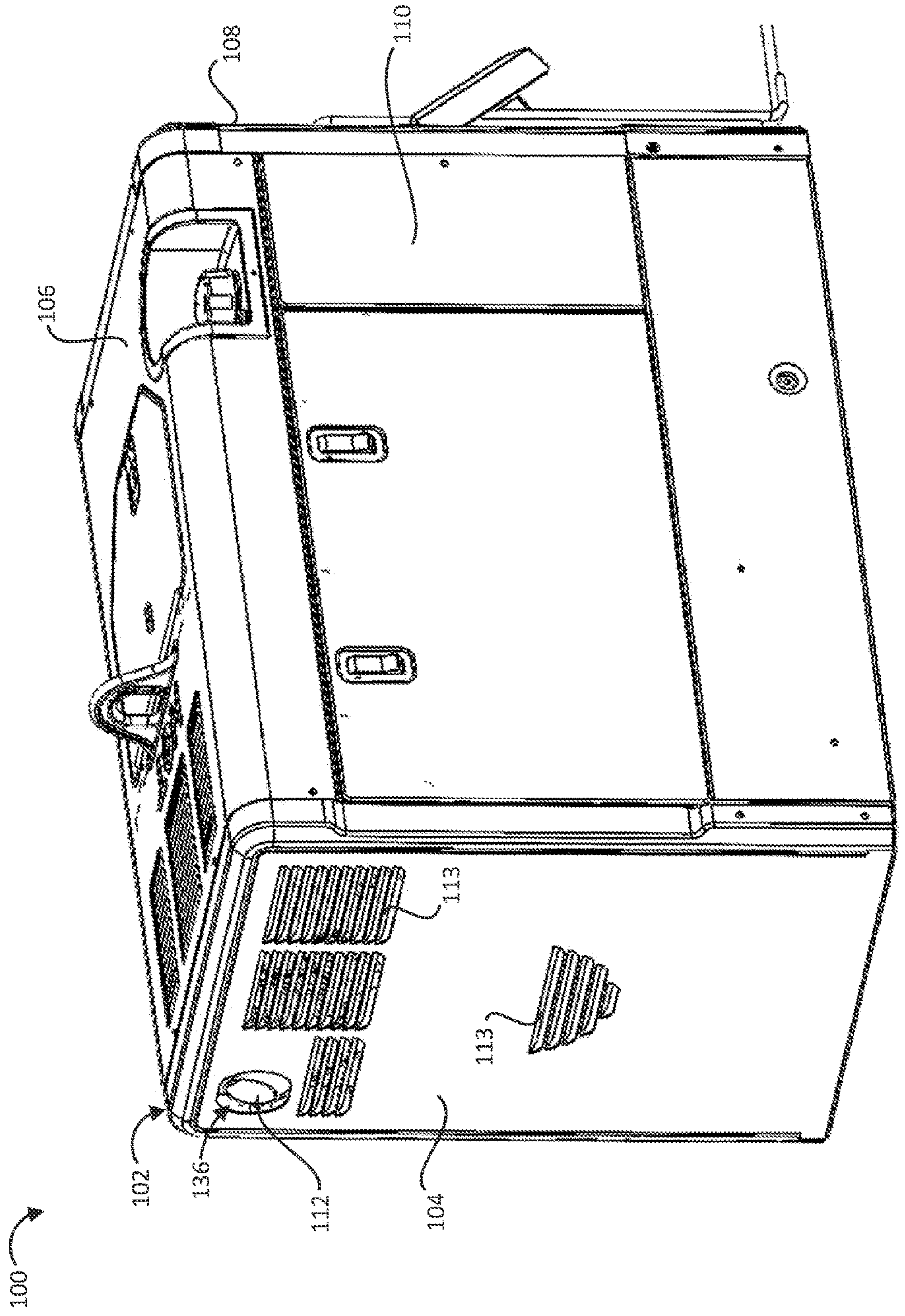
FIG. 1 is a perspective view of an example power system including a tail pipe at or near a rear surface of an enclosure.

FIG. 1 is a perspective view of an example power system 100 including a tail pipe 112 at or near a rear surface 104 of an enclosure 102. The power system 100 may be used for various applications, such as, for example, providing compressed air, generating power, pumping, and/or welding support. As illustrated in FIG. 1, the power system 100 includes the enclosure 102. The enclosure 102 protects internal components of the power system 100 from the environment, as well as providing a safety, sound, and aesthetic barrier for an operator using or within range of the power system 100. The enclosure 102 is primarily constructed with sheet metal, and may include multiple panels. For example, the enclosure 102 may include the rear surface 104, a top surface 106, a front surface 108, and side surfaces 110 when installed in a predetermined orientation (e.g., when the power system 100 is installed in accordance with the power system's 100 intended use). In some cases, one or more of the rear surface 104, the top surface 106, the front surface 108, and the side surfaces 110 may each include multiple panels. One or more of the panels may be removable and/or one or more of the panels may open, to permit access. In some examples, one or more of the rear surface 104, the top surface 106, the front surface 108, or the side surfaces 110 may define additional features. For example, the rear surface 104 may define louvers 113 to permit airflow into or out of the enclosure 102. Any of the rear surface 104, the top surface 106, the front surface 108, or the side surfaces 110 may include additional or alternative features.

As illustrated in FIG. 1, the rear surface 104 of the enclosure 102 defines an aperture 136. The aperture 136 is adjacent (e.g., aligned with, next to) an exhaust end (e.g., the end surface) of the tail pipe 112 such that the tail pipe 112 can release exhaust from an engine of the power system 100 external to the enclosure 102. In some examples, the aperture 136 may be near the top of the rear surface 104. Such a configuration may direct the exhaust released by the tail pipe 112 in a suitable or intended direction (e.g., away from the power system 100). Additionally, or alternatively, the aperture 136 may be on the rear surface 104 closer to one of the side surfaces 110 (e.g., as compared to being centered on the rear surface 104 between the side surfaces 110). In the power system 100 illustrated in FIG. 1, the aperture 136 is near the top left corner of the rear surface 104 (e.g., when viewed facing the rear surface 104). Similarly, such a configuration may be beneficial to direct the exhaust external to the enclosure 102 in a preferred direction. In other examples, the aperture 136 may be located at a different position on the rear surface 104.

Figure 2:
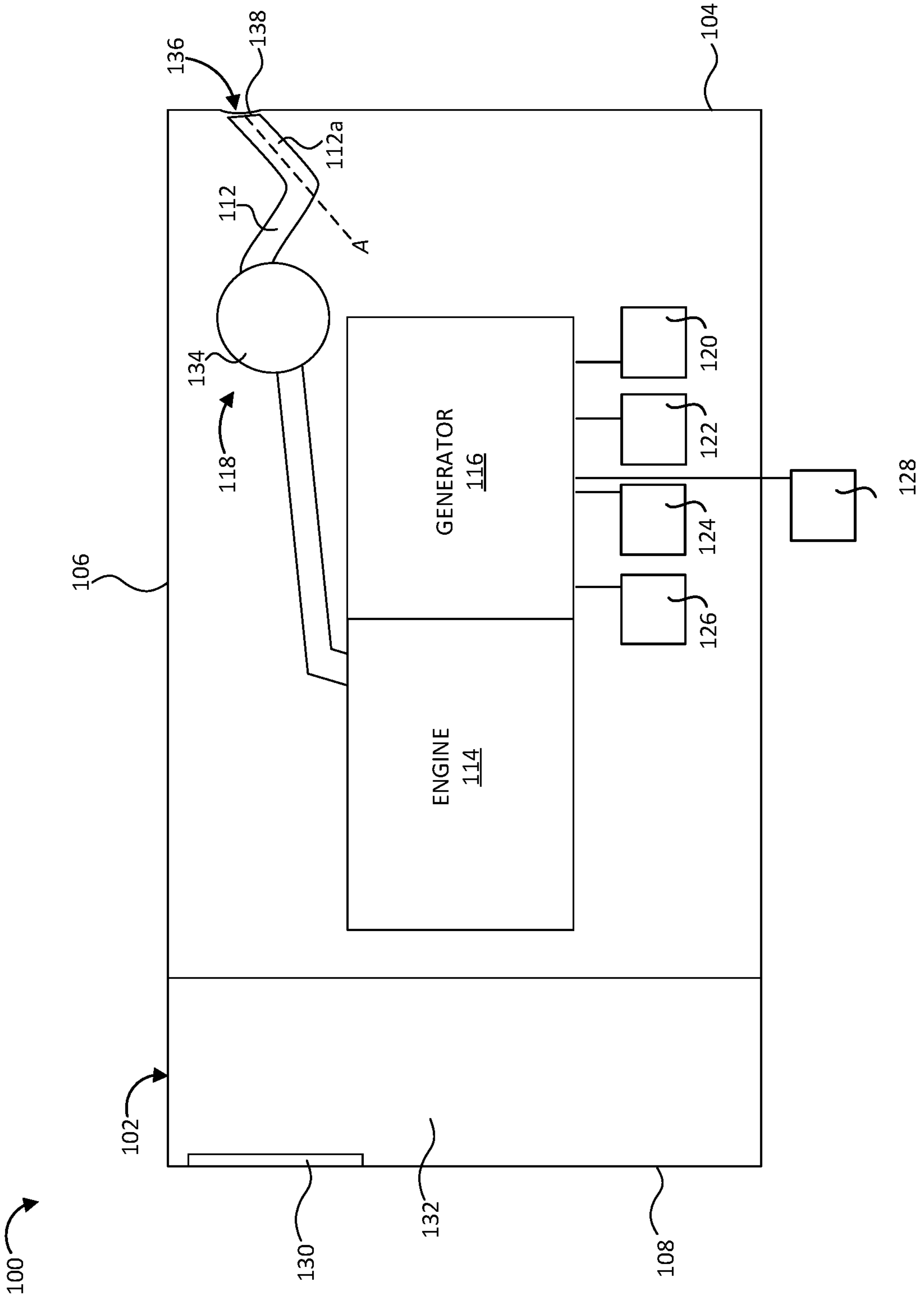
FIG. 2 is a block diagram of the example power system including the tail pipe at or near the rear surface of the enclosure FIG. 1.

FIG. 2 is a block diagram of the example power system 100 including the tail pipe 112 at or near the rear surface 104 of the enclosure 102 of FIG. 1. The example power system 100 may include other components not specifically discussed herein, or may omit one or more of the components discussed herein. The components of the power system 100 may be arranged within the enclosure 102 in any suitable configuration.

The example power system 100 of FIG. 2 is an engine-driven power system. The system 100 includes an engine 114 that drives a generator 116 to generate electrical power. The engine 114 may be an internal combustion engine, a diesel engine, a fuel cell, etc. The engine 114 is configured to output mechanical power to drive the generator 116. In some examples, the engine 114 is forward (e.g., toward the front surface 108 within the enclosure 102) of the generator 116. The engine 114 receives fuel from a fuel tank.

In some examples, the power system 100 includes one or more power subsystems. For example, the generator 116 may provide the electrical power to welding-type conversion circuitry 120 configured to output welding-type power, an air compressor 122 configured to output pneumatic power, a hydraulic pump 124 configured to output hydraulic flow, auxiliary power conversion circuitry 126 configured to output AC power and/or DC power (e.g., DC and/or AC electrical output(s)), and/or any other load device. The example hydraulic pump 124 and the air compressor 122 may be powered by mechanical power from the engine 114 and/or by electrical power from the generator 116.

In some examples, an external power supply subsystem 128 may be coupled (e.g., plugged in, hardwired, etc.) to the power system 100 to convert at least one of the AC power or the DC power from the auxiliary power conversion circuitry 126 and/or the generator 116 to at least one of AC power or DC power, such as to power external devices that have different power requirements. The example external power supply subsystem 128 may also be communicatively coupled to control circuitry 132 of the power system 100 (e.g., wirelessly, via power line communication, via a communication cable, etc.) to enable the control circuitry 132 to control the demand and/or output of the external power supply subsystem 128.

The welding-type conversion circuitry 120 converts output power from the generator 116 (e.g., via the intermediate voltage bus) to welding-type power based on a commanded welding-type output. The welding-type conversion circuitry 120 provides current at a desired voltage to an electrode and a workpiece via output terminals to perform a welding-type operation. The welding-type conversion circuitry 120 may include, for example, a switched mode power supply or an inverter fed from an intermediate voltage bus. The welding-type conversion circuitry 120 may include a direct connection from a power circuit to the output (such as to the weld studs), and/or an indirect connection through power processing circuitry such as filters, converters, transformers, rectifiers, etc.

The auxiliary power conversion circuitry 126 converts output power from the generator 116 (e.g., via the intermediate voltage bus) to AC power (e.g., 120 VAC, 240 VAC, 50 Hz, 60 Hz, etc.) and/or DC power (e.g., 12 VDC, 24 VDC, battery charging power, etc.). The auxiliary power conversion circuitry 126 outputs one or more AC power outputs (e.g., AC outlets or receptacles) and/or one or more DC power outputs (e.g., DC outlets or receptacle). The power system 100 enables multiple ones of the power subsystems (e.g., the hydraulic pump, the air compressor 122, the welding-type conversion circuitry 120, the auxiliary power conversion circuitry 126, the external power supply subsystem 128, etc.) to be operated simultaneously.

In some examples, the power system 100 includes a user interface 130. The user interface 130 includes an input device configured to receive inputs selecting mode(s) representative of welding-type processes, mode(s) representative of one or more battery charging modes, mode(s) representative of a vehicle load, and/or other modes such as a pneumatic load and/or a hydraulic load. In the example of FIG. 2, the user interface 130 is located on the front surface 108 of the enclosure 102.

The power system 100 includes an exhaust system 118. In some examples, the exhaust system 118 includes a muffler 134 and a tail pipe 112. The muffler 134 and tail pipe 112 function as an exhaust of the engine 114. In this way, the exhaust system 118 is configured to release exhaust gases from the engine 114 external to the enclosure 102. The muffler 134 also reduces the sound of the engine 114 during operation. The tail pipe 112 directs the exhaust gas from the engine 114 external to the enclosure 102. For example, as seen in FIG. 2, the tail pipe 112 releases the exhaust external to the enclosure 102 through the aperture 136 defined by the rear surface 104 of the enclosure 102. In this way, an exhaust end 138 of the tail pipe 112 is adjacent to the aperture 136 to release the exhaust external to the enclosure 102, therefore limiting the amount of exhaust released into the enclosure 102 or circulated back into the enclosure 102 (e.g., after release).

The tail pipe 112 can have any suitable configuration. In some examples, as seen in FIG. 2, at least a portion **112*a* of the tail pipe 112 extends upward toward the exhaust end 138 of the tail pipe 112. In some such examples, the portion 112*a* may extend at an angle toward the exhaust end 138. For example, the portion 112*a* may extend both upward and toward the rear surface 104. In other words, a tail pipe axis A (e.g., the axis along the portion 112*a* of tail pipe 112 including the exhaust end 138) may be angled upward relative to an axis along the length (e.g., a longitudinal centerline from front surface 108 to rear surface 104) of the power system 100. The upward and/or outward orientation of the tail pipe 112 may direct the exhaust external to the enclosure 102** in a preferred direction.

In some examples, a plane defined by the exhaust end 138 of the tail pipe 112 may be parallel to the rear surface 104 of the enclosure 102. In other examples, the plane defined by the exhaust end 138 of the tail pipe 112 may not be parallel to the rear surface 104 of the enclosure 102. In some such examples, an angle between the plane defined by the exhaust end 138 of the tail pipe 112 and the rear surface 104 may be an acute angle (e.g., less than 90 degrees). For example, the angle may be less than about 50 degrees, about 30 degrees, about 15 degrees, or less than about 10 degrees. In other examples, the angle between the plane defined by the exhaust end 138 of the tail pipe 112 and the rear surface 104 may be a different angle.

The disclosed power system 100 does not include a tail pipe 112 or another component of the exhaust system 118 that extends through the top surface 106 of the enclosure 102. Rather, the exhaust system 128 (e.g., the tail pipe 112) is arranged relative the rear surface 104 of the enclosure 102. For example, the exhaust end 138 of the tail pipe 112 is at or near the rear surface 104.

In some examples, an entire length of the tail pipe 112 may be within the enclosure 102. In such examples, the exhaust end 138 of the tail pipe 112 may be at or near the rear surface 104 (or the aperture 136 defined by the rear surface 104). In this way, the tail pipe 112 terminates at or before the rear surface 104. In contrast to conventional power systems, such examples of the disclosed power systems 100 may have decreased exposure of a high temperature tail pipe to an operator, improved aesthetics (e.g., not visible or less visible tail pipe 112), have a smaller footprint for packaging and shipping, permit reduced clearance for installation, and may not require a user to install the tail pipe 112 (or a portion thereof) (e.g., is preassembled).

Figure 3:
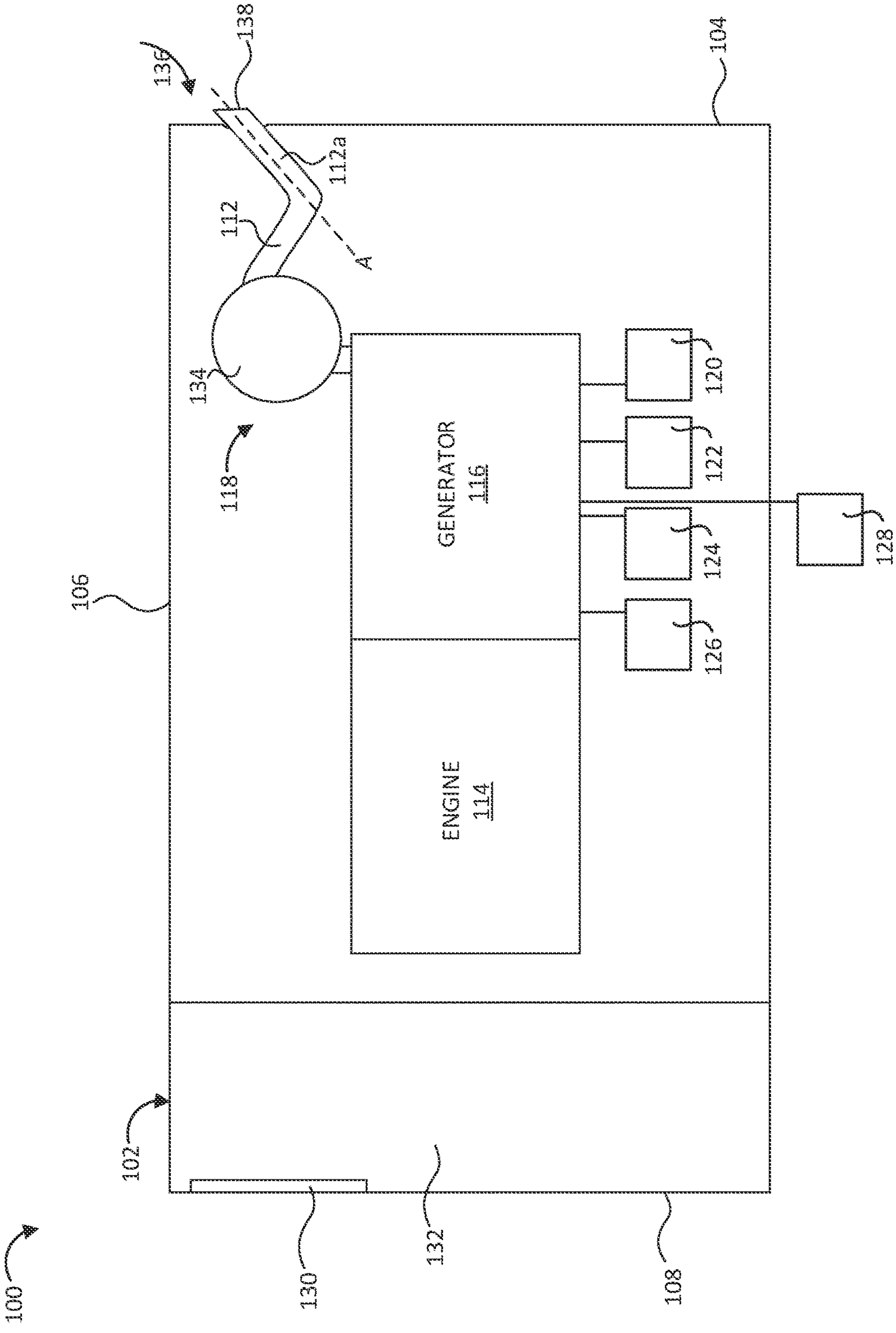
FIG. 3 is a block diagram of the example power system including a tail pipe extending through the rear surface of an enclosure.

FIG. 3 is a block diagram of the example power system 100 including a tail pipe 112 extending through the rear surface 104 of an enclosure 102. In some examples, at least a portion of the tail pipe 112 may extend external to the enclosure 102. For example, a portion of the tail pipe 112 may extend through the rear surface 104 of the enclosure 102 (e.g., through aperture 136). In some such examples, less of the tail pipe 112 extends outside of the enclosure 102 in the disclosed power system 100 as compared to conventional power systems. For instance, in some examples, less than about 1 inch of the tail pipe 112 may be external the enclosure 102. Additionally or alternatively, the tail pipe 112 extends less than any extension of other features of the enclosure 102 or power system 100. For example, one or more louvers, bezels, trim elements, connectors, and/or any other elements extend farther from the plane of the rear surface 104 than the end of the tail pipe 112. In this way, the disclosed power system 100 with a portion of the tail pipe 112 external to the enclosure 102 may still expose less of the tail pipe 112 to the exterior of the enclosure 102 than conventional power systems. Such a power system 100 may likewise may have improved aesthetics, have a smaller footprint, allow for reduced installation clearances, and may not require a user to install the tail pipe 112.

In other examples, a user may install a portion of tail pipe 112. For example, a user may install an extension portion to the tail pipe 112 to make the tail pipe longer, direct the exhaust in a specific direction, and/or connect the tail pipe 112 to an exhaust evacuation system (e.g., to direct exhaust a longer distance from the enclosure). In some examples, the extension portion may be rotatable to enable a use to direct the exhaust as desired. In other examples, a user may install the tail pipe 112 itself.

Figure 4:
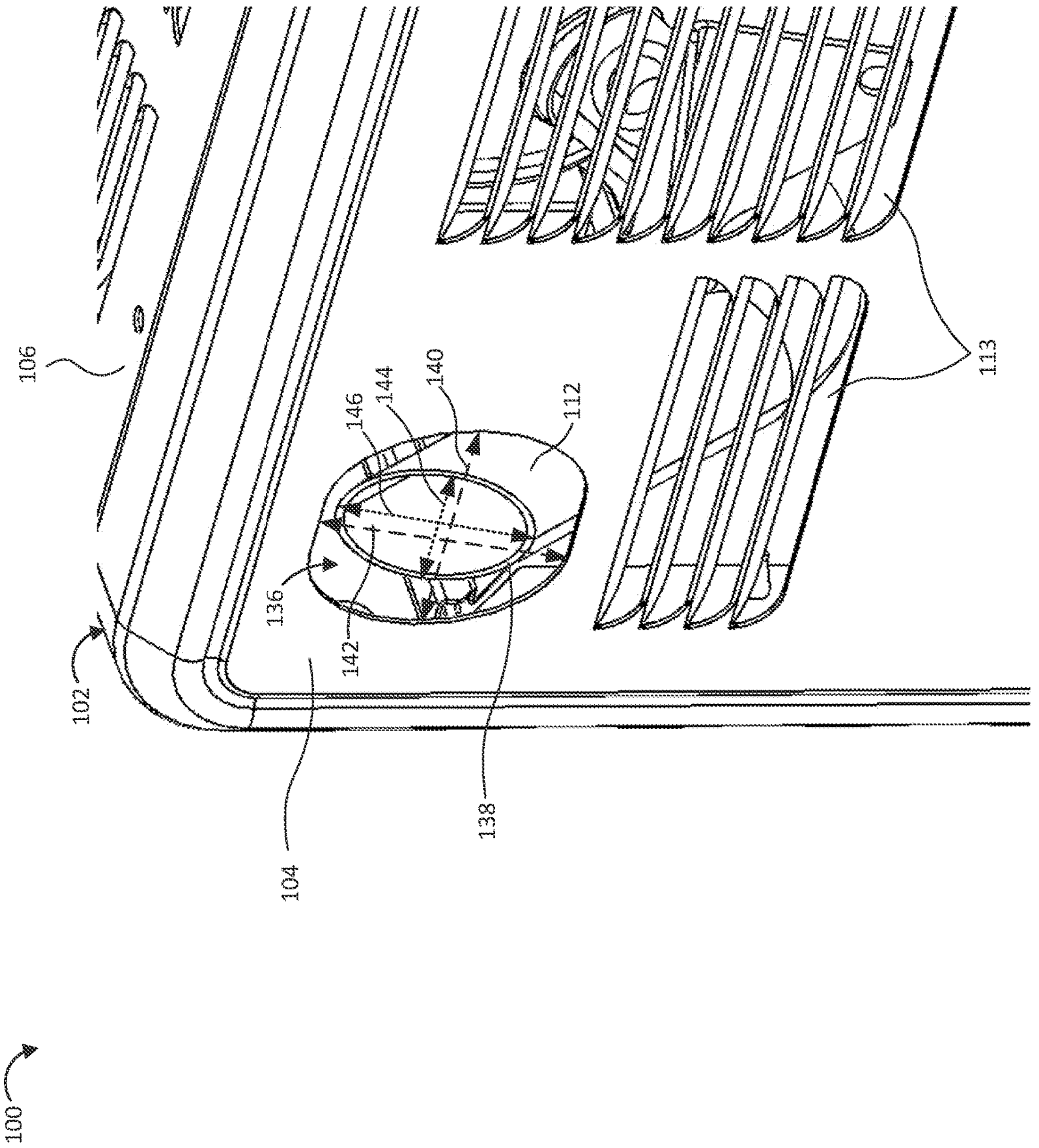
FIG. 4 is an enlarged view of the rear surface of the enclosure of FIGS. 1-2.

FIG. 4 is an enlarged view of the rear surface 104 of the enclosure 102 of FIGS. 1-2. As discussed above, the rear surface 104 defines the aperture 136. The aperture 136 is adjacent to the exhaust end 138 of the tail pipe 112 such that the tail pipe 112 can release exhaust from engine 114 external to the enclosure 102. The aperture 136 may be sized and shaped in any suitable manner to facilitate release of the exhaust external to the enclosure 102.

The aperture 136 may define a first cross-sectional length 140 and a second cross-sectional length 142. The exhaust end 138 of the tail pipe 112 may likewise define a third cross-sectional length 144 and a fourth cross-sectional length 146. In some examples, such as the example illustrated in FIG. 4, the first cross-sectional length 140 of the aperture 136 may be larger than the third cross-sectional length 144 of the exhaust end 138 of the tail pipe. Additionally, or alternatively, the second cross-sectional length 142 of the aperture 136 may be larger than the fourth cross-sectional length 146 of the exhaust end of the tail pipe 112. In this way, the overall cross-sectional area of the aperture 136 may be larger than the overall cross-sectional area of the exhaust end 138 of the tail pipe 112. Such a configuration may facilitate release of the exhaust external to the enclosure 102 through the aperture 136 despite any vibration or other movement of the tail pipe 112 during operation of the power system 100.

In other examples, one or more of the cross-sectional lengths 140, 142 of the aperture 136 may be substantially the same as or similar to one or more of the cross-sectional lengths 144, 146 of the exhaust end 138 of the tail pipe 112. For example, in cases in which the tail pipe 112 extends external to the enclosure 102 (e.g., as described with respect to FIG. 3), the cross-sectional lengths 140, 142 of the aperture 136 may be substantially the same as or similar to the cross-sectional lengths 144, 146 of the exhaust end 138 of the tail pipe 112 to define a clearance fit, transition fit, an interference fit, or any suitable fit between the tail pipe 112 and the aperture 136.

The aperture 136 and the exhaust end 138 of the tail pipe 112 may be any suitable shape. For example, the aperture 136 and/or the exhaust end 138 of the tail pipe 112 may have a circular, elliptical, rectangular, or any other shaped cross-section. In some examples, the aperture 136 and the exhaust end 138 may define the same cross-sectional shape. In other examples, the aperture 136 and the exhaust end 138 may define different cross-sectional shapes.

As utilized herein, "and/or" means any one or more of the items in the list joined by "and/or". As an example, "x and/or y" means any element of the three-element set {(*x*), (*y*), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system for performing welding-type operations comprising:

an enclosure defining a rear surface when installed in a predetermined orientation;

an engine within the enclosure;

a generator within the enclosure and configured to convert mechanical power from the engine to electrical power;

an exhaust system comprising a muffler and a tail pipe, wherein a muffler end of the tail pipe extends downward from the muffler towards an exhaust end, and wherein the exhaust end of the tail pipe is at or near the rear surface of the enclosure and extends upward from the muffler end of the tail pipe toward the rear surface of the enclosure;

welding-type conversion circuitry configured to convert electrical power from the generator to welding-type power; and one or more of, within the enclosure:

an air compressor coupled to at least one of the electrical power from the generator or the mechanical power from the engine and configured to output compressed air;

a hydraulic pump configured to generate hydraulic flow from at least one of the electrical power from the generator or the mechanical power from the engine; or auxiliary power conversion circuitry configured to convert the electrical power from the generator to at least one of AC output power or DC output power.

2. The power system of claim 1, wherein a plane defined by the exhaust end of the tail pipe is parallel to the rear surface of the enclosure.

3. The power system of claim 1, wherein an angle between a plane defined by the exhaust end of the tail pipe and the rear surface of the enclosure is an acute angle.

4. The power system of claim 1, wherein the enclosure defines a top surface, and wherein the top surface does not include an exhaust extending therefrom.

5. The power system of claim 1, wherein the enclosure defines a front surface, and the engine is forward of the generator and toward the front surface within the enclosure.

6. The power system of claim 1, wherein at least a portion of the tail pipe comprising the exhaust end extends external to the enclosure.

7. The power system of claim 6, wherein the exhaust end is 1 inch or less from the rear surface.

8. The power system of claim 1, wherein an entire length of the tail pipe is within the enclosure.

9. The power system of claim 8, wherein the tail pipe terminates flush with the rear surface or within the enclosure adjacent the rear surface.

10. The power system of claim 9, wherein the rear surface defines an aperture adjacent to the exhaust end of the tail pipe.

11. The power system of claim 10, wherein the tail pipe is configured to release exhaust external to the enclosure though the aperture.

12. The power system of claim 10, wherein a first cross-sectional length of the aperture is larger than a second cross-sectional length of the exhaust end of the tail pipe.

13. A power system for performing welding-type operations comprising:

an enclosure defining a rear surface when installed in a predetermined orientation;

an engine within the enclosure;

a generator within the enclosure and configured to convert mechanical power from the engine to electrical power;

an exhaust system comprising a muffler and a tail pipe, wherein an exhaust end of the tail pipe is at or near the rear surface of the enclosure and defines a plane of the exhaust end, wherein the rear surface defines an aperture adjacent to the exhaust end of the tail pipe and the rear surface further defines a plane of the rear surface near the aperture, wherein the tail pipe comprises a downward portion of the tail pipe adjacent to an upward portion of the tail pipe, and wherein the upward portion of the tail pipe comprises the exhaust end;

welding-type conversion circuitry configured to convert electrical power from the generator to welding-type power; and one or more of, within the enclosure:

an air compressor coupled to at least one of the electrical power from the generator or the mechanical power from the engine and configured to output compressed air;

a hydraulic pump configured to generate hydraulic flow from at least one of the electrical power from the generator or the mechanical power from the engine; or auxiliary power conversion circuitry configured to convert the electrical power from the generator to at least one of AC output power or DC output power.

14. The power system of claim 13, wherein a top edge of the tail pipe extends further in a rear direction of the enclosure than a bottom edge of the tail pipe.

* * * * *